March 1, 1927.
F. KORN
CAKE BOX
Filed Feb. 11, 1926

1,619,423

INVENTOR.
FRANCISCA KORN.
By Arthur L. Lee
ATTY.

Patented Mar. 1, 1927.

1,619,423

UNITED STATES PATENT OFFICE.

FRANCESCA KORN, OF SAN FRANCISCO, CALIFORNIA, ASSIGNOR OF ONE-HALF TO CARRIE SEILER, OF SAN FRANCISCO, CALIFORNIA.

CAKE BOX.

Application filed February 11, 1926. Serial No. 87,603.

My invention relates to improvements in containers or boxes for the storing and transporting of cakes and the like to keep the same in a fresh condition and to prevent such cakes from being marred or damaged.

The primary object of my invention is to provide an improved cake box adapted to form an efficient storage container.

Another object is to provide an improved device of the character described which will facilitate the placing and removing of cakes therefrom.

A further object is to provide an improved container which will effectually prevent injury or marring of a cake or its frosting when the cake is being inserted or removed from the container or while being transported from one place to another.

Another object is to provide an improved device of the character described which will give ready access to the cake and by which the cake may be easily transported.

A still further object is to provide an improved container which is neat and compact in form and which can be efficiently packed or stacked for shipment or storage.

Figure 1:
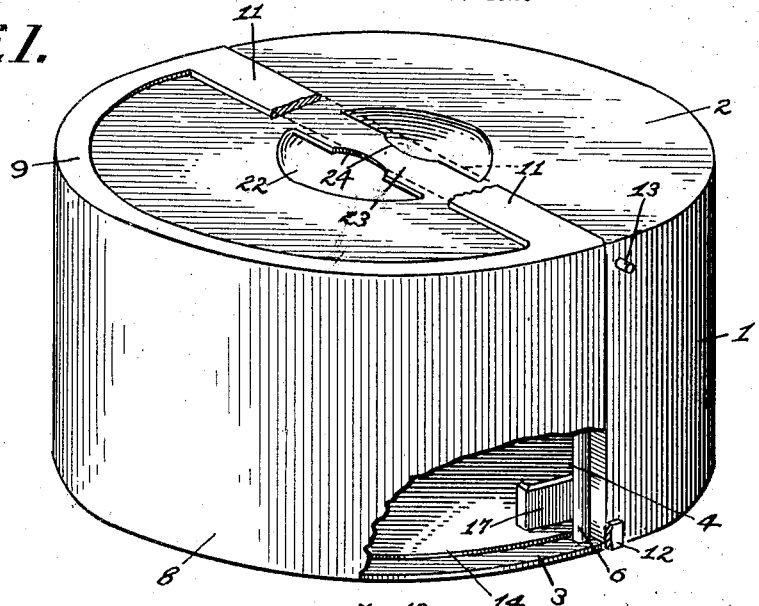
Figure 2:
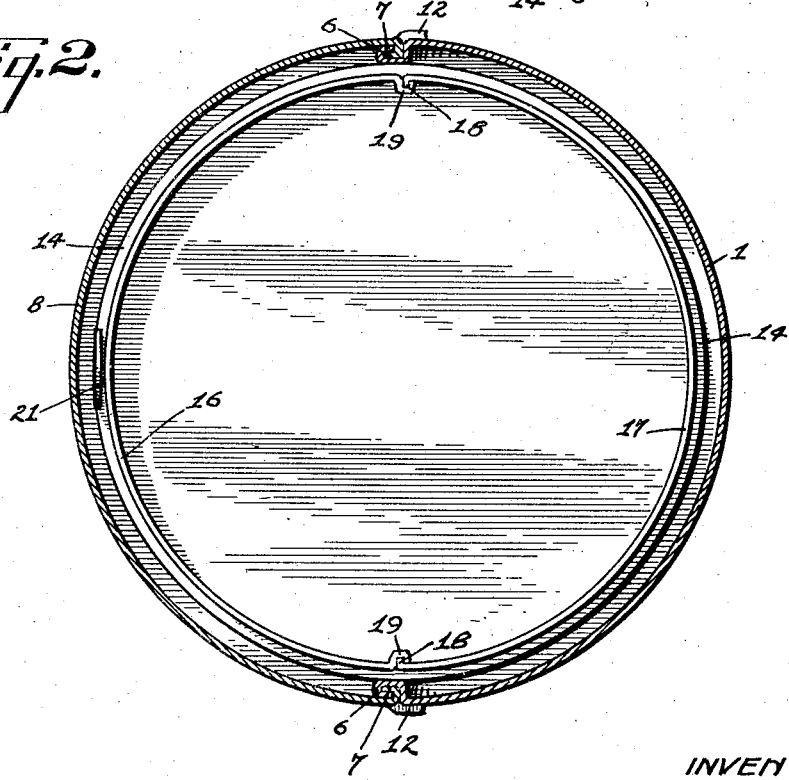

I accomplish these and other objects by means of the improved device disclosed in the drawings forming a part of the present specification wherein like characters of reference are used to designate similar parts throughout said specification and drawings and in which, Fig. 1 is a perspective view of my improved cake box, parts being broken away to show the structure thereof, and Fig. 2 is a horizontal section of the box and cover.

Referring to the drawings the numeral 1 is used to designate in general a cylindrical container having the top and bottom closed by top and bottom portions 2 and 3 respectively. The container has a semi-circular opening 4 formed in one side thereof, the edges of the container wall being crimped as at 6 adjacent the opening to slidably engage a correspondingly crimped portion 7 formed upon the edges of a semi-circular cover member 8 arranged to complete the cylindrical form of the container and to close the opening 4 in the side thereof. The crimped portions 6 and 7 are arranged to form a close sliding fit so that when the cover is lowered to closed position a substantially air tight container will be formed.

The cover member 8 is preferably provided with an inwardly turned flange 9 adapted to be seated upon the top 2 of the container when the cover is in closed position, said flange operating to reinforce and give strength and rigidity to the cover. A handle portion 11 is formed upon the cover member 8, said handle preferably consisting of a flat strip extending across the top of the container and forming a means whereby the cover member may be raised relatively to the container 1 to uncover the opening 4. Lugs 12 are formed upon the lower edges of the cover member 8 and arranged to engage pins or other suitable stops 13 arranged adjacent the top of the container 1 to limit the upward movement of the cover relative to the container.

A tray 14 rests freely upon the bottom 3 of the container, said tray preferably being arranged to be inserted under a cake to support the same within the container. The tray 14 is provided with an annular guard consisting of a pair of semi-circular members 16 and 17 arranged to extend around the tray in slightly spaced relation to the edge thereof. The member 17 is secured upon the tray and is provided with inwardly turned ends 18 arranged to be detachably engaged by crimped ends 19 formed upon the member 16. A lip 21 is upwardly turned upon the front edge of the tray to form a means for moving the tray into or out of the container without touching the cake supported thereon.

The top 2 of the container has a depression 22 formed at the center thereof and is provided with a handle 23 extending diametrically across the depression whereby the container may be conveniently lifted. The handle member 11 is arranged to occupy a position parallel to the handle 23 and when the cover member 8 is in closed position the handle 11 rests flat against the handle portion 23 whereby the two handle members may be grasped together and the container and cover lifted together as a single unit. Notches 24 are formed in the sides of the handle member 23 to permit the handle member 11 to be conveniently grasped independently of the handle 23 when it is desired to raise the cover relative to the container.

In operation, the cake is placed upon the tray 14 and the tray and cake inserted into the container through the opening 4. When the cover portion 8 is lowered after the cake has been inserted, the lower edge of the container matches with the edge of the bottom member 3 of the container to form a substantially air tight container, whereby the cake may be kept fresh and moist. In placing the cake upon the tray, the guard members 16 and 17 hold the cake in slightly spaced relation to the edge of the tray. As the tray is inserted into the container, the edge of the tray will abut against the wall of the container before the cake itself or any frosting or icing applied thereto can contact with the wall of the container, thereby insuring that the cake or its frosting will not be damaged or marred.

If it is desired to transport the cake, the handle members 11 and 23 are grasped together and the container lifted and carried as a unit, the guards operating to prevent the sides of the cake from contacting with the container during such transportation. When it is desired to remove the cake from the container, the cover 8 is raised by lifting the same upwardly by means of the handle member 11. When the cover has been raised, the tray is grasped by means of the lip 21 and moved outwardly through the opening 4.

It will be noted that on the preferred construction illustrated in the drawings, the container is cylindrical in form and that the handle portions 11 and 23 do not cause any appreciable projection upon the top of the container. This structure is particularly desirable because it permits the containers to be readily stacked for shipment or storage. It also affords a substantially flat upper surface upon which objects may be safely placed.

The device may be made of any suitable material and may be finished or decorated in any desired manner to obtain an ornamental appearance if desired. The specific form and construction is, of course, subject to modification in numerous ways without departing from the spirit of my invention. I therefore do not wish to restrict myself to the specific form and construction illustrated and described, but wish to avail myself of all modifications which may fall within the scope of the appended claims.

Having thus described my invention what I claim as new and desire to secure by Letters Patent is,

1. A cake box comprising a cylindrical container closed at top and bottom and having a semi-circular opening in one side thereof to admit a cake; and a semi-circular cover slidably connected to the container and arranged to be moved upwardly relative to the container to open and close the opening.

2. A cake box comprising a cylindrical container closed at top and bottom and having a semi-circular opening in one side thereof to admit a cake; and a semi-circular cover having crimped edges slidably engaging the adjacent edges of the container to open and close the opening; and means for limiting the movement of the cover relative to the container to normally prevent the separation thereof.

3. A cake box comprising a cylindrical container closed at top and bottom and having a semi-circular opening in one side thereof to admit a cake; and a semi-circular cover slidably connected to the container and vertically movable to open and close the opening; and a tray arranged to rest upon the bottom of the container to support a cake therein, said tray being removable through the opening.

4. A cake box comprising a cylindrical container closed at top and bottom and having a semi-circular opening formed in one side thereof to admit a cake; a semi-circular cover slidably connected to the container and vertically movable to open and close the opening; a tray arranged to rest upon the bottom of the container to support a cake therein, said tray being movable through the opening; and a guard secured in spaced relation to the edge of the tray to prevent a cake supported thereon from contacting with the sides of the container.

5. A cake box comprising a cylindrical container closed at top and bottom and having a semi-circular opening formed in one side thereof to admit a cake; a semi-circular cover slidably connected to the container to open and close the opening therein; a tray arranged to rest upon the bottom of the container to support a cake therein, said tray being removable through the opening; and a guard mounted in spaced relation to the edge of the tray to prevent a cake supported thereon from contacting with the sides of the container, said guard being formed in semi-circular portions one of which is detachable from the other portion and the tray.

6. A cake box comprising a cylindrical container closed at top and bottom and having a depression formed in the top thereof and having a semi-circular opening formed in one side thereof to admit a cake; a handle extending across the depression whereby the container may be lifted; and a semi-circular cover slidably connected to the container and vertically movable to open and close the opening.

7. A cake box comprising a cylindrical container closed at top and bottom and having a depression formed in the top thereof and having a semi-circular opening formed in one side thereof to admit a cake; a handle extending across the depression whereby the container may be lifted; and a semi-circular cover slidably connected to the container to open and close the opening; and a handle connected to the cover and extending across the top of the container whereby the cover may be moved relatively to the container.

8. A cake box comprising a cylindrical container closed at top and bottom and having a depression formed in the top thereof and having a semi-circular opening formed in the one side thereof to admit a cake; a handle extending across the depression whereby the container may be lifted; and a semi-circular cover slidably connected to the container to open and close the opening; and a handle connected to the cover and extending across the top of the container whereby the cover may be moved relatively to the container, said handle being arranged parallel to the container handle whereby said handles may be grasped together for lifting the container.

9. A cake box comprising a cylindrical container closed at top and bottom and having a depression formed in the top thereof and having a semi-circular opening formed in one side thereof to admit a cake; a handle connected to the top of the container and extending across the depression whereby the container may be lifted; a semi-circular cover slidably connected to the container to open and close the opening; a handle connected to the cover for moving the cover relatively to the container, said handle being arranged parallel to the container handle whereby said handles may be grasped together for lifting the container, and means for limiting the movement of the cover relatively to the container.

10. A cake box comprising a cylindrical container closed at top and bottom and having a depression formed in the top thereof and having a semi-circular opening formed in one side thereof to admit a cake; a handle connected to the top of the container and extending across the depression whereby the container may be lifted; a semi-circular cover slidably connected to the container to open and close the opening; a handle connected to the cover for moving the cover relatively to the container, said handle being arranged parallel to the container handle whereby said handles may be grasped together for lifting the container, and means for limiting the movement of the cover relatively to the container; and a tray removably mounted within the bottom of the container to support a cake therein.

In witness whereof I hereunto set my signature.

FRANCESCA KORN.